(12) United States Patent
Douglas (10) Patent No.: US 12,384,198 B2
(45) Date of Patent: Aug. 12, 2025

(54) TIRE AND RIM SEAL FOR A WHEEL

(71) Applicant: Jeffrey P Douglas, San Clemente, CA (US)

(72) Inventor: Jeffrey P Douglas, San Clemente, CA (US)

( * ) Notice: Subject to any disclaimer, the term of this patent is extended or adjusted under 35 U.S.C. 154(b) by 0 days.

(21) Appl. No.: 18/124,505

(22) Filed: Mar. 21, 2023

(65) Prior Publication Data

US 2024/0316986 A1   Sep. 26, 2024

(51) Int. Cl.
*B60C 5/16* (2006.01)
*B60B 21/12* (2006.01)
*B60C 15/028* (2006.01)

(52) U.S. Cl.
CPC ............... *B60B 21/12* (2013.01); *B60C 5/16* (2013.01); *B60C 15/028* (2013.01)

(58) Field of Classification Search
CPC ..... B60C 23/02; B60C 23/04; B60C 23/0491; B60C 23/0493; B60C 15/024; B60C 15/028; B60C 5/16
See application file for complete search history.

(56) References Cited

U.S. PATENT DOCUMENTS 779,505 A  *  1/1905  Stein .................... B60C 15/028
152/501

FOREIGN PATENT DOCUMENTS

DE      102018119615    *  2/2019
EP       1539508 B1    *  4/2008 ........... B60C 15/028
WO    WO 2013/021198   *  2/2013

* cited by examiner

*Primary Examiner* — Justin R Fischer (57) ABSTRACT

A tire and rim seal is disclosed by which to reliably seal the beads of a tire against the rim of a wheel on which the tire is mounted so as to advantageously prevent the tire from leaking air and slipping off the beads of the rim. The tire and rim seal includes an elastomer that is seated on the rim and a rigid backing that lays on top of the elastomer. A plurality of threaded bolts extend from the rigid backing and run through the elastomer and the rim of the wheel. A corresponding plurality of threaded nuts are rotated around the threaded bolts and tightened against the rim so as to pull the rigid backing towards the rim. Accordingly, a compressive force is generated by which to cause the elastomer to be sandwiched between the rigid backing and the rim so as to expand along the rim and move into sealing engagement with the rim and the beads.

20 Claims, 12 Drawing Sheets

TIRE AND RIM SEAL FOR A WHEEL

BACKGROUND OF THE INVENTION

1. Field of the Invention

This invention relates to a tire rim seal for a wheel of the kind found on a motor vehicle or a bicycle. The tire rim seal includes an elastomer to which a compressive force is applied to cause the elastomer to expand along the rim of the wheel and into sealing engagement with the beads of the tire that is mounted on the rim to prevent the leakage of air with which the tire is inflated at the interface between the beads and the rim.

2. Background Art

A conventional tube-type tire is commonly known to have an inner tube associated therewith. A primary disadvantage of such a tube-type tire is that the rubber material of the inner tube is subject to pinching during use. Such a pinch may result in a tear and, ultimately, a pinch flat, whereby to place the tire out of service or in need of repair. The tools that are commonly used when a new tube-type tire is installed can also cause a pinch in the inner tube and the resulting damage to the tire.

In this same regard, the inner tube associated with the conventional tube-type tire is characteristically large, bulky and correspondingly heavy. These characteristics are not well suited for achieving the high performance that is required by racing vehicles on which such a tube-type tire may be used. In fact, such conventional tube-type tires can contribute to significant poundage when mounted on a wheel which is likely to reduce speed and increase energy (e.g., fuel) consumption.

The tire used by most vehicles is mounted on a rim and inflated with air to enable the vehicle to travel smoothly over a roadway. However, when the roadway is rough or the tire is exposed to considerable wear, air may leak from the tire. Over time, the loss of air can cause the tire to become flat which may negatively impact the ride of the vehicle and create a safety hazard. In particular, air with which the tire has been inflated may leak to the atmosphere at the interface between the tire and the rim on which the tire is mounted. What is more, in cases where the tire is no longer held securely against the rim, the tire is known to slip off the bead of the rim under certain driving conditions.

Therefore, what would be desirable is a tube-type tire that can be used by high performance (e.g., racing) vehicles but has the characteristics of a tubeless tire so as to avoid the shortcomings that have heretofore been associated with conventional tube-type tires. What would also be desirable is a means by which to reliably seal the tire to the rim of the wheel so as to prevent the leakage of air from the tire at the interface of the tire with the rim and reduce the ability of the tire to slip on the rim.

SUMMARY OF THE INVENTION

In general terms, a seal is disclosed for a tire that is mounted on the rim of a wheel and inflated with air. The tire and rim seal includes a compressible elastomer that is seated on and around the beadwell of the rim to lie between the opposing beads formed in the sidewalls of the tire. A rigid (i.e., stiff) non-compressible backing or spine lays on top of the elastomer. A plurality of fasteners (e.g. threaded bolts) extend radially inward from the rigid spine through each of the beadwell of the rim and the elastomer that is seated on the rim. A corresponding plurality of complementary fasteners (e.g., threaded nuts) surround the threaded bolts at the ends thereof that extend outwardly from the rim.

The nuts are rotated around the bolts to be tightened against the rim. At the same time, the bolts are pulled outwardly from below the beadwell of the rim by which to correspondingly pull the rigid spine against the elastomer. The rigid spine generates a pressure against the elastomer which causes the elastomer to be compressed between the rigid spine and the beadwell. Accordingly, the elastomer expands laterally along the rim to move into sealing engagement with the beads of the tire. By virtue of the foregoing, a reliable seal is established to prevent the leakage of air from the tire at the interface between the tire and the rim. What is more, the beads of the tire are pressed firmly against the rim of the wheel to prevent the tire from spinning on its rim.

Another tire seal of this invention to be connected to the rim of a wheel includes a stiff and flexible C-shaped spine that extends continuously around the rim. The opposite ends of the C-shaped spine are spaced from one another, and a gear driven tensioning device is located within the space to pull the opposite ends together. The tensioning device has a gear housing and a threaded bolt extending from the gear housing to be received by a mounting hole that runs through the beadwell of the rim and an elastomer that lays in the beadwell below the spine. A threaded drive shaft extends from a first gear wheel located in the gear housing through the threaded bolt to be surrounded by a drive shaft nut below the beadwell. A pair of threaded gear shafts are connected at first ends thereof to respective second and third gear wheels that are coupled (i.e., meshed) to the first gear wheel within the gear housing. The opposite ends of the pair of gear shafts are received within threaded couplers of gear shaft end caps that are connected to respective opposite ends of the C-shaped spine.

The tire and rim seal is established when the drive shaft nut at the bottom of the driver shaft is rotated towards the beadwell by which to cause the drive shaft and the first gear wheel connected to the drive shaft to rotate. The rotation of the first gear wheel is imparted to be second and third gear wheels to which the first gear wheel is meshed. The rotation of the second and third gear wheels in turn causes a rotation of the pair of gear shafts connected to the second and third gear wheels. The rotating pair of gear shafts move in opposite directions through the threaded couplers of the gear shaft end caps and axially through the opposite ends of the C-shaped spine. Accordingly, the opposite ends of the C-shaped spine are pulled towards one another by which the spine is tightened around the rim to generate a compressive force against the elastomer lying on the rim below the spine. The elastomer is thusly flattened to expand laterally outward along the rim to move into sealing engagement with the beads of the tire.

Rather than a single spine that extends continuously around the rim of a wheel to generate a compressive force against an elastomer laying on the rim below the spine, the tire and rim seal of this invention may include a plurality of spine segments that are aligned end-to-end one another. Threaded bolts that extend radially from the spine segments run through a corresponding plurality of elastomer segments for receipt by respective mounting holes formed in the rim. The threaded bolts are surrounded below the rim by threaded nuts. The nuts are rotated around bolts to be tightened against the bottom of the rim. Accordingly, the bolts are pulled outwardly from the rim so as to correspondingly pull the spine segments against the elastomer segments by which a compressive force is generated against the elastomer segments. The elastomer segments are thusly compressed and flattened so as to expand laterally along the rim to move into sealing engagement with the beads of the tire.

DESCRIPTION OF THE PREFERRED EMBODIMENT

The tire and rim seal which forms the present invention is now disclosed while referring to the drawings. This invention is applicable to any air filled tire that is mounted on a rim to provide a particular advantage of enabling a tubeless tire to be substituted for a traditional tube-type tire. Such tires include, but are not limited to, those associated with a motor vehicle and a bicycle. As will soon be described, by virtue of the tire and rim seal of this invention, a resilient elastomeric material is provided to ensure that the tire will be reliably sealed to its rim to prevent the undesirable escape of air which could lead to the tire becoming flat over time. In this case, a tube-type tire can function as if its inner tube had been removed. What is more, a compressive force generating means is provided to press the bead of the tire firmly against the rim whereby to prevent the tire from undesirably slipping on its rim.

Figure 1:
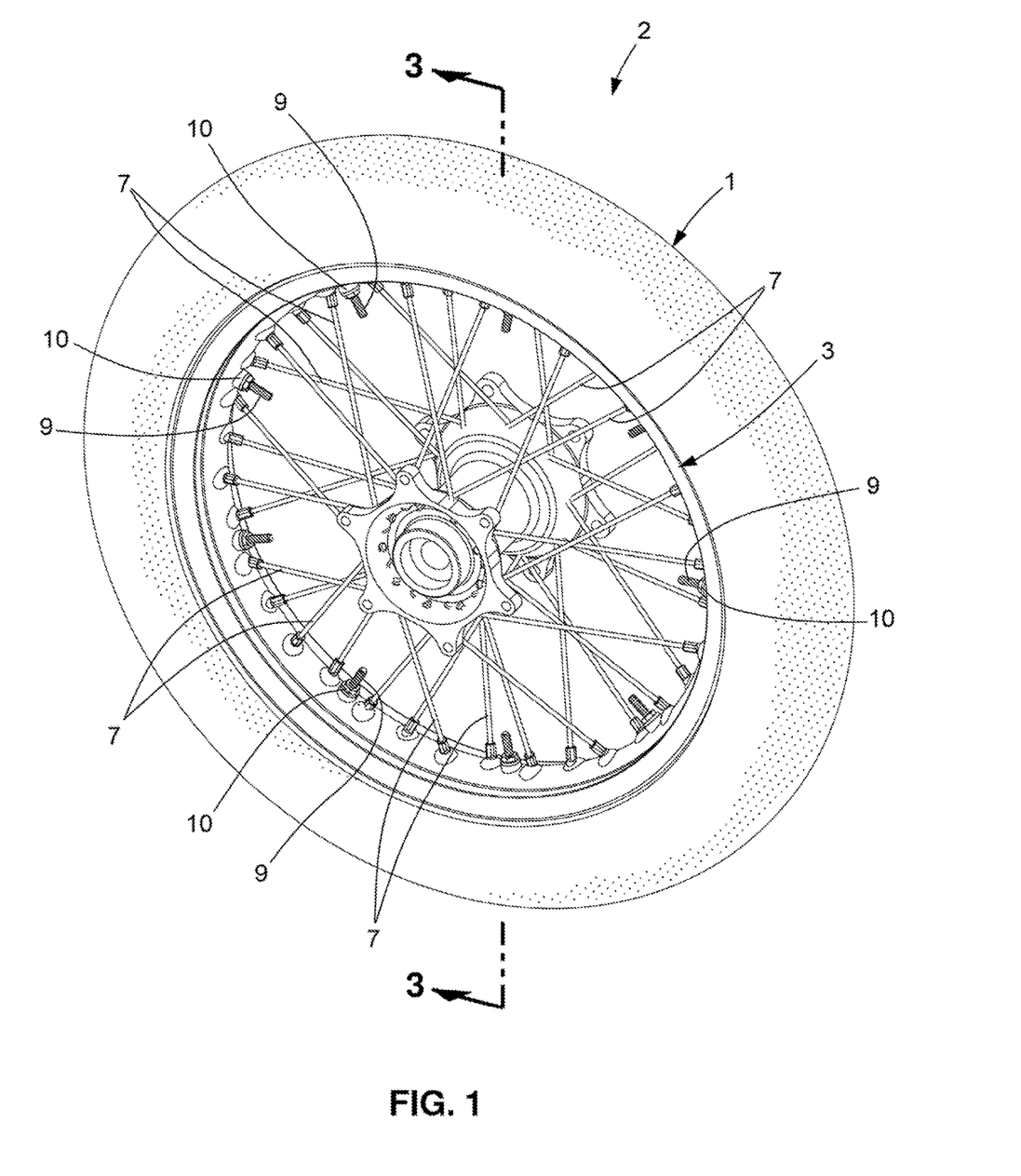
FIG. 1 is a perspective view of a wheel including a tire shown mounted on a rim of the wheel and having a tire and rim seal which forms the present invention.

FIG. 1 of the drawings shows a wheel 2 and a tire 1 that is mounted on a rim 3 of the wheel. The tire 1 includes a tire and rim seal according to a first embodiment of this invention. The wheel 2 shown in FIG. 1 has a hub 5 at the center to be coupled to an axle (not shown). The hub 5 is surrounded by the rim 3. A set of spokes 7 extend outwardly from the hub 5 to be connected to the rim 3 of wheel 2.

Figure 2:
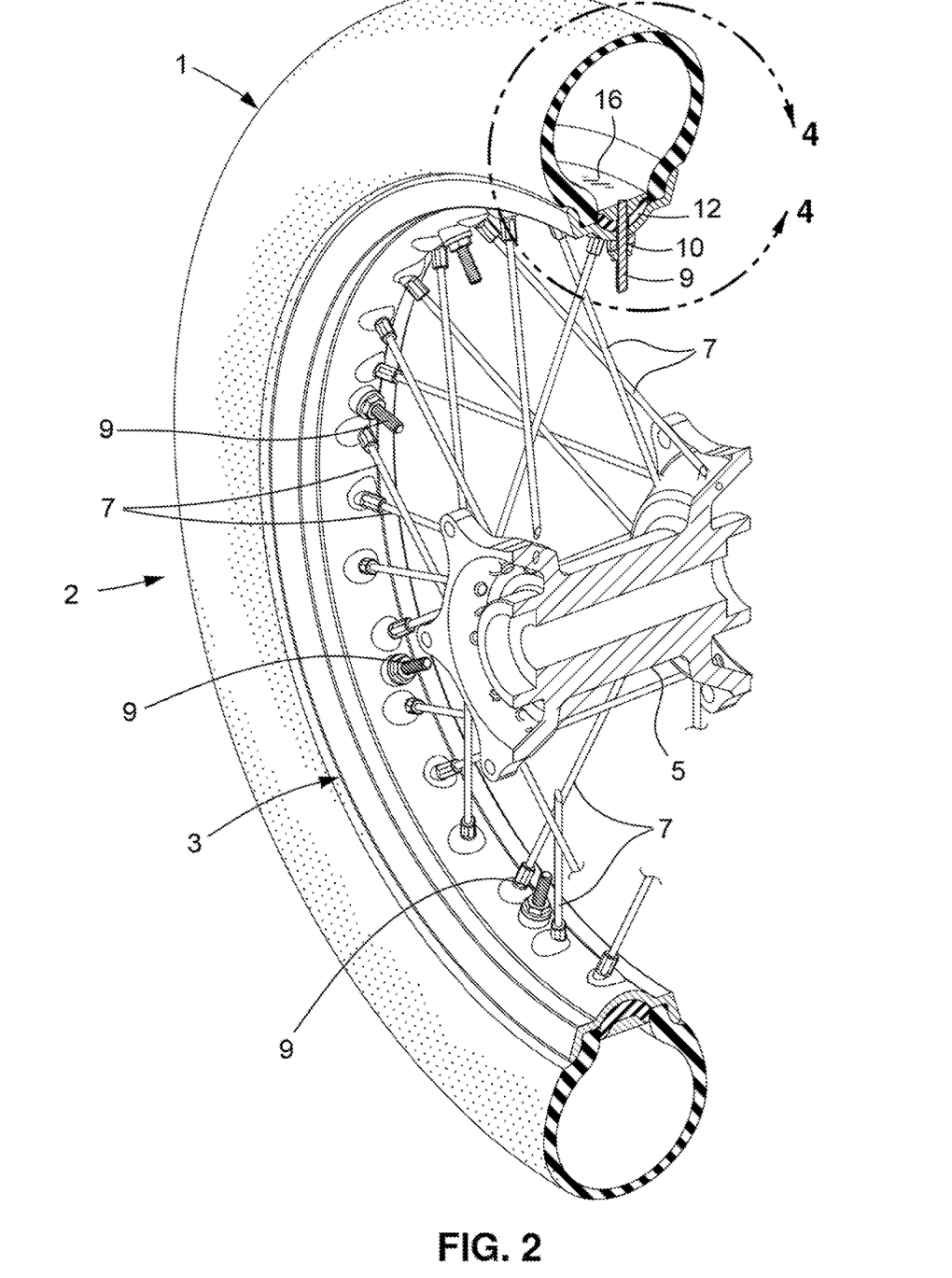
FIG. 2 is a cross-section taken along lines 2-2 of FIG. 1 showing features of the tire and rim seal according to a first embodiment.
Figures 3, 4:
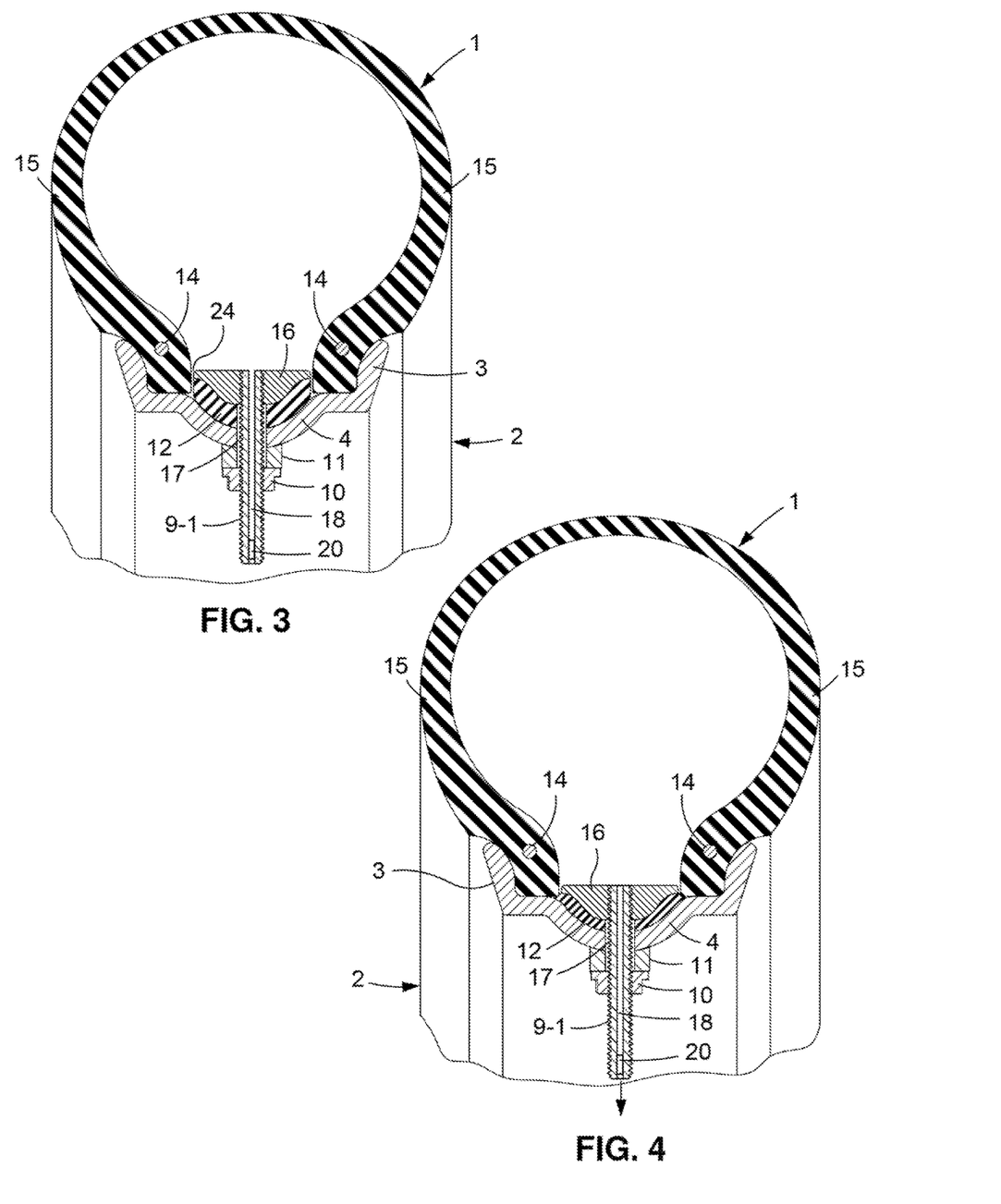
FIG. 3 is a cross-section of the tire and the rim of the wheel with the tire and rim seal shown in FIG. 2 lying on the rim and located below a rigid backing between the beads of the tire.
FIG. 4 is an enlarged detail taken from FIG. 2 showing the tire and rim seal after being compressed between the rigid backing and the rim so as to expand into sealing engagement with the beads of the tire.

As is shown in FIGS. 2 and 3 of the drawings, a layer of elastomer 12 lays on and extends continuously around the beadwell 4 of rim 3. The elastomer 12 can be any suitable resilient material, such as rubber, or the like, that is adapted to change its shape in response to a compressive force applied thereto. The elastomer 12 is sized to lie between the beads 14 that are located at the bottom of the opposing sidewalls 15 of the tire 1 at which to engage the lips of the rim 3. A rigid (i.e., stiff) spine 16 covers the top of the elastomer 12. By way of example, the rigid spine 16 is manufactured from metal, such as aluminum. As in the case of the elastomer 12, the rigid spine 16 shown in FIGS. 2 and 3 extends continuously around the beadwell 4 of the rim 3. The spine 16 functions as a non-compressible backing for the resilient elastomer 12 and extends between the beads 14 at the bottom of sidewalls 15.

One of a plurality of threaded bolts 9 is shown extending from the spine 16 and running through a mounting hole 17 that is formed in the beadwell 4 and the elastomer 12 that lays on the beadwell. One of a corresponding plurality of threaded nuts 10 is shown mated to the end of each threaded bolt 9 that extends outwardly from the bottom of the beadwell 4. The nut 10 is tightened against a spacer 1I below the rim 3 to hold the bolt 9 in place and maintain the beadwell 4, the elastomer 12, and the rigid spine 16 laying one above the other.

Turning now to FIGS. 3 and 4 of the drawings, the advantages provided by this first embodiment for the tire and rim seal are now explained. FIG. 4 shows a particular one of the plurality of bolts (designated 9-1) of FIGS. 1 and 2 extending radially inward from the rigid spine 16 and running through each of the elastomer 16 and mounting hole 17 formed in the beadwell 4. The designated bolt 9-1 communicates with the interior of the tire. In this example, the bolt 9-1 is hollow so as to function as a valve that provides a channel 18 through which the tire 1 can be inflated with air. A pressure controlled valve closure 20 is located in the channel 18 of the hollow bolt 9-1 to prevent the tire 1 from leaking the air with which it has been inflated.

FIG. 3 shows the threaded nut 10 loosely tightened against the beadwell 4 so that a corresponding minimum compressive force is applied to the elastomer 12 that lies between the beadwell 4 and the rigid spine 16. In this case, the elastomer 12 is relaxed and has a relatively large thickness. At the same time, the elastomer 12 is separated from the opposing beads 14 of the tire 1 between which the elastomer is located. Consequently, there is a space 24 between the elastomer 12 and the beads 14 of the tire 1. As in the case of a conventional tire without the tire and rim seal of this invention, the interior of the tire 1 is able to communicate with the rim 3 which can result in air being undesirably leaked from the tire 1 to the atmosphere via the space 24 and the interface between the beads 14 and the rim 3.

The aforementioned space 24 is eliminated and the tire and rim seal is established by rotating the threaded nut 10 around the threaded bolt 9-1 until the nut is tightened against the bottom of the beadwell 4 of the rim 3. Accordingly, the bolt 9-1 is pulled outwardly from the beadwell 4 in the direction represented by the arrow shown in FIG. 4. At the same time, the spine 16 is correspondingly pulled by the bolt 9-1 towards and against the rim 3 so that pressure is applied to the elastomer 12 by which the elastomer is now compressed in all directions so as to be sandwiched between the rigid spine 16 and the beadwell 4. In response to it being pulled towards the rim 3, the elastomer 12 is pressed against the rim to seal any cracks in the rim or any holes in the rim created by the spokes 7 or bolts 9. In the case where the rim is an unsealed tube-type rim, the compressed elastomer will seal the rim to allow it to be used with a tubeless tire.

In further response to it being compressed, the elastomer 12 also expands laterally outward along the rim 3 towards the beads 14 of the tire 1. The elastomer 12 is now flattened which results in a reduced thickness. Accordingly, the laterally outward expanding elastomer 12 is moved into airtight sealing engagement against the inside surface of the beads 14 to advantageously prevent air from escaping the tire at the interface of the beads 14 with the rim 3.

At the same time that the tire and rim seal is created, the outwardly expanding elastomer 12 presses the beads 14 of the tire towards the lips of the rim 3 to seal the tire beads to its interface with the rim lips. By virtue of the foregoing, the tire 1 is less likely to spin on the rim 3 and slide off the beads as the tire is rotated at high speeds and under severe side loads, often referred to as burping.

Figure 5:
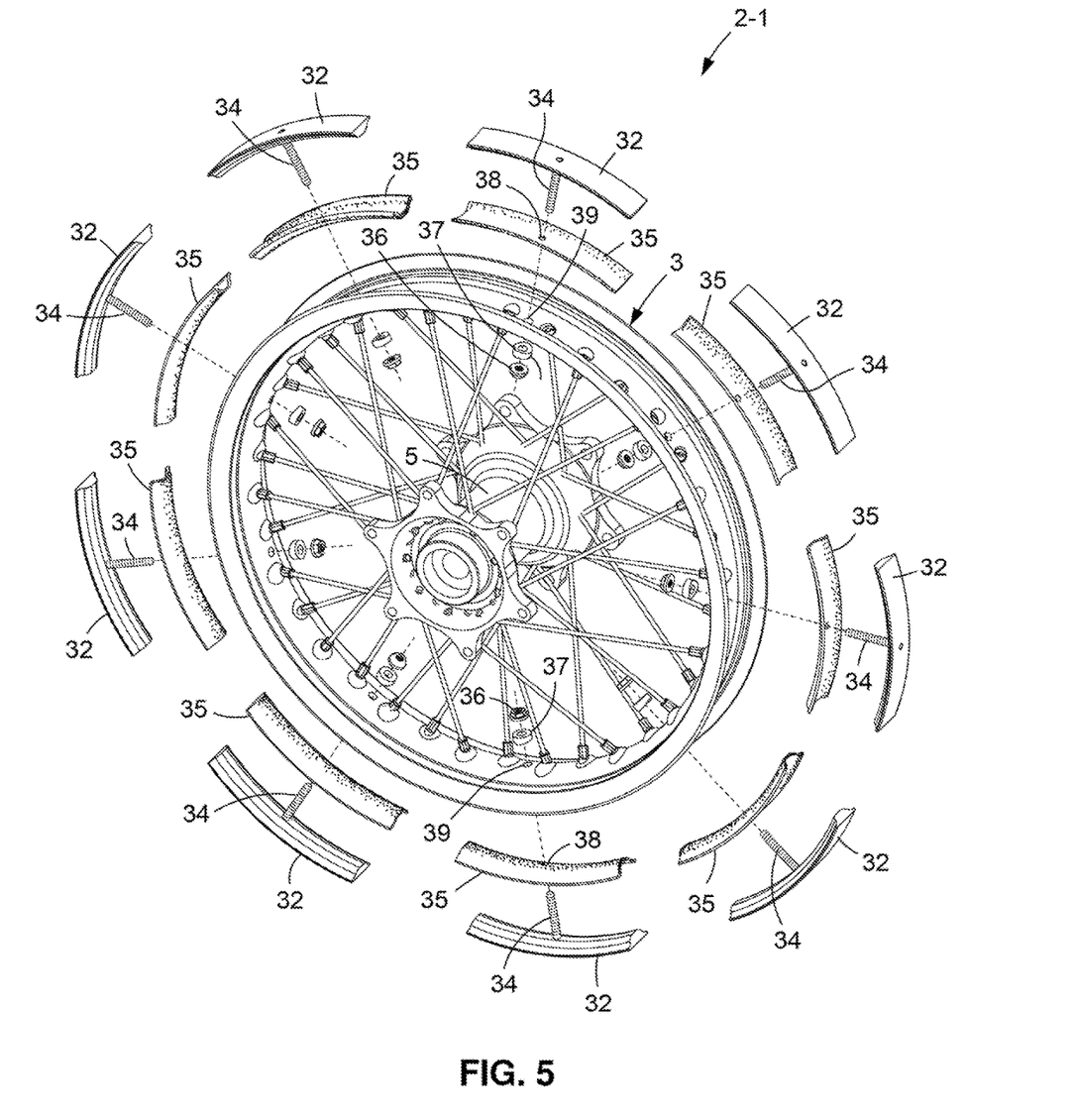
FIG. 5 is an exploded view of a wheel including a tire and rim seal according to a second embodiment.
Figure 6:
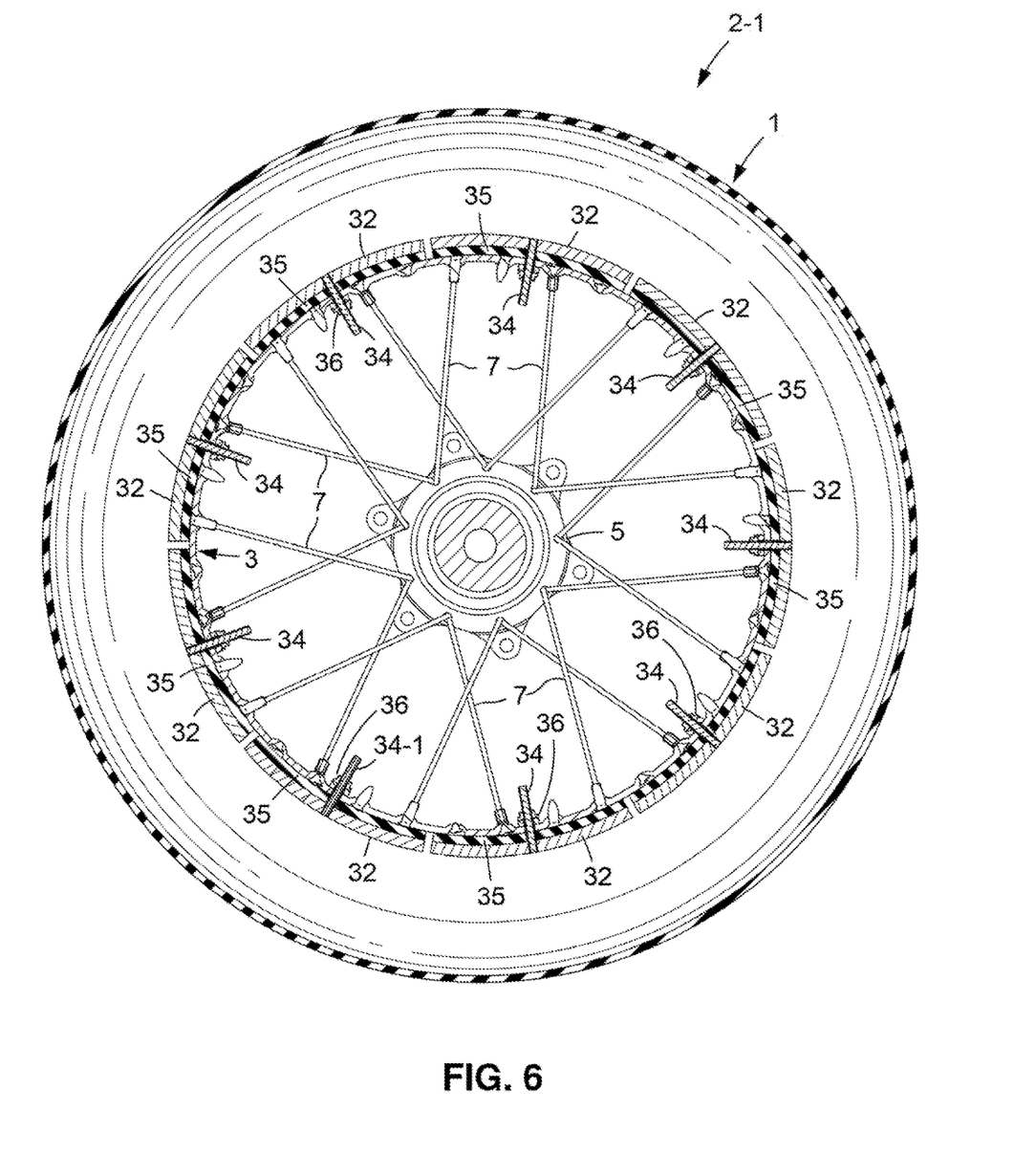
FIG. 6 is a cross-section of the wheel shown in FIG. 5 with a tire mounted on a rim and including the tire and rim seal of FIG. 5 lying on the rim.
Figure 7:
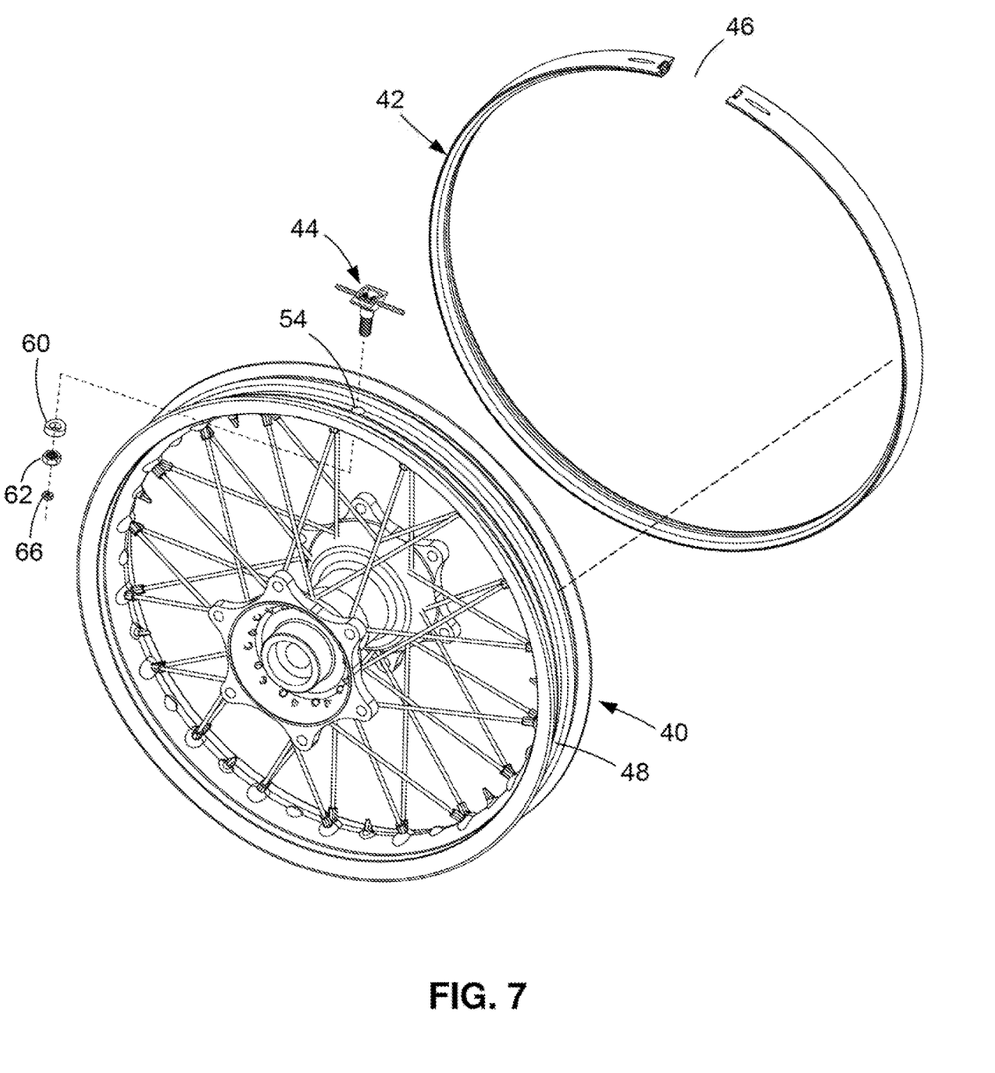
FIG. 7 is an exploded view of another tire and rim seal of this invention including an open C-shaped backing and a gear driven tensioning device for closing the backing around the rim of the wheel.

The stiff spine 16 shown in FIGS. 3 and 4 that is pulled towards and applies a pressure to compress the elastomer 12 against the beadwell 4 is a single ring-shaped force-generating backing that extends continuously around the rim 3 to cover the elastomer 12. According to a second embodiment for a tire and rim seal of this invention, rather than being a single continuously extending backing, the stiff spine that compresses and expands the elastomer can be manufactured to include more than one backing member. By way of example, in the case of the tire 1 and the wheel 2-1 that are shown in FIGS. 5 and 6, a ring-shaped spine includes a plurality of (e.g., nine) stiff spine segments 32 that are aligned end-to-end one another so as to extend completely around the rim 3. A threaded bolt 34 extends radially inward towards the hub 5 of wheel 2-1 from each spine segment 32 so as to run through a hole 38 formed in a respective one of a corresponding plurality of elastomer segments 35. The bolts 34 continue through mounting holes 39 formed in the rim 3 against which the elastomer segments 35 are held. The bolts 34 are surrounded by spacers 37 and threaded nuts 36. The bolts 34 and nuts 36 shown in FIGS. 5 and 6 perform the same function as the bolts 9 and nuts 10 that were previously described while referring to FIGS. 1-4. In this regard, one of the bolts 34-1 of FIG. 6 is hollow to create a channel through which the tire 1 is inflated with air.

As another embodiment of this invention, a tire and rim seal including a one-piece, C-shaped spine 42 is shown in FIGS. 7-15 of the drawings. Like the tire and rim seals shown in FIGS. 1-6, the tire and rim seal of FIGS. 7-15 is configured to apply a compressive force to an elastomer that lays on the rim 48 of a wheel 40. The C-shaped spine 42 is preferably a stiff backing such as a band or belt that is manufactured, for example, from aluminum or nylon. In this case, a gear driven tensioning device 44 is connected to the wheel 40 to tighten and close the C-shaped spine 42 around the rim 48 and against the elastomer. The tensioning device 44 is held in the space 46 (of FIG. 7) which separates the opposite ends of the C-shaped spine 42 at which to generate a force for pulling the opposites ends towards one another in order to close the spine and thereby produce the compressive force necessary to create the seal.

Figure 8:
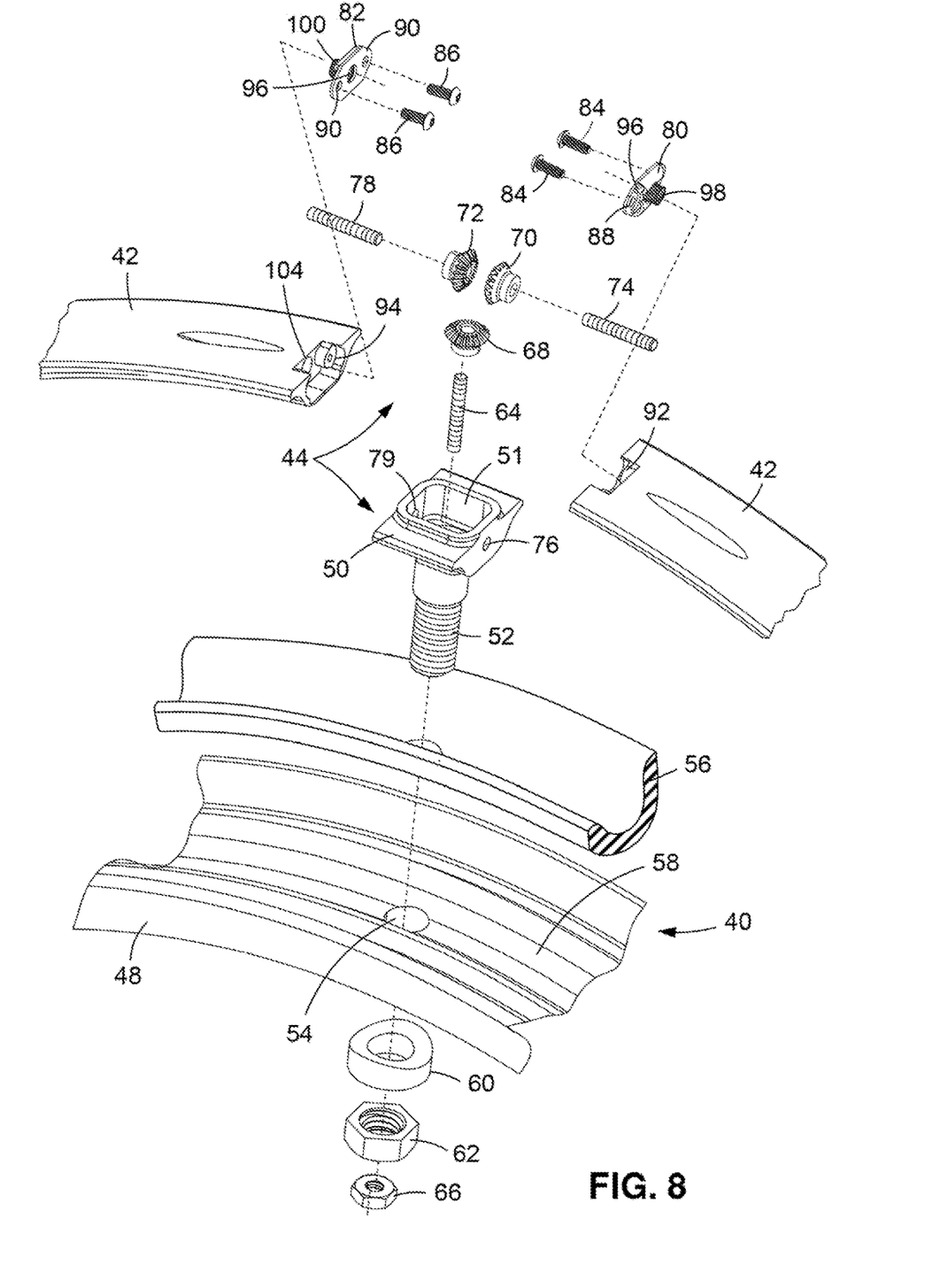
FIG. 8 is an exploded view of the tensioning device shown in FIG. 7 for closing the C-shaped backing around the rim above an elastomer lying on the rim.

By way of example only, the tensioning device 44 for closing the C-shaped spine 42 around the rim 48 can be a miniwinch, a rack and pinion, a cable pull, or a hydraulic device. Referring particularly in this regard to FIGS. 8-12, a particular example of a gear driven tensioning device 44 is shown including a gear housing 50. Depending downwardly from a gear receptacle 51 that is surrounded by the gear housing 50 is a threaded mounting shaft 52 for connecting the gear housing 50 to the wheel 40. As is best shown in FIG. 8, a mounting hole 54 is formed through the rim 48 and the elastomer 56 that lays on and runs around the beadwell 58 of the rim. The gear housing 50 of the tensioning device 44 is connected to the rim 48 by inserting the threaded mounting shaft 52 through the mounting hole 54. A beveled washer 60 surrounds the bottom of the threaded mounting shaft 52 below the beadwell 58, and a correspondingly threaded locking nut 62 is located below the washer 60 to be rotated around and tightened against the shaft 52. Accordingly, the threaded mounting shaft 52 is locked against the rim 48 of wheel 40 such that the gear housing 50 is held in place between the opposite ends of the C-shaped spine 42 at which to face upwardly within the tire 1 (best shown in FIGS. 9 and 10).

A threaded drive shaft 64 extends axially through the mounting shaft 52 of the tensioning device 44 below the gear housing 50. A correspondingly threaded drive shaft nut 66 is rotated into mating engagement with the drive shaft 64 below the bottom of the mounting shaft 52 (best shown in FIG. 9). The purpose of the drive shaft nut 66 for controlling the pulling force that is applied by the tensioning device 44 to the opposite ends of the C-shaped spine 42 will be explained hereinafter. A first mitre gear wheel 68 is attached to the top of the drive shaft 64 to lie opposite the drive shaft nut 66. Second and third mitre gear wheels 70 and 72 are arranged face-to-face one another to be coupled (i.e., meshed) to opposite sides of the first gear wheel 68. A first threaded gear shaft 74 runs horizontally through a first hole 76 that is formed through one side of the gear receptacle 51 of the gear housing 50 of the tensioning device 44. A second threaded gear shaft 78 runs horizontally through a second hole 79 that is formed through an opposite side of the gear receptacle 51.

The second gear wheel 70 is attached to an inside end of the first gear shaft 74 within the gear receptacle SI of housing 50, and the third gear wheel 72 is attached to an inside end of the second gear shaft 78 within the gear receptacle 51. Thus, as is best shown in FIGS. 11 and 12, the first, second and third gear wheels 68, 70 and 72 are all meshed together within the gear receptacle 51 of the gear housing 50 such that a rotation of the first gear wheel 68 is imparted to the second and third gear wheels 70 and 72.

A gear shaft end cap 80 and 82 is attached to each of the opposite ends of the C-shaped spine 42 between which the gear housing 50 of the tensioning device 44 is held. The end caps 80 and 82 are connected to the spine by pairs of threaded fasteners 84 and 86 which extend through holes 88 and 90 that are formed in the end caps and axially aligned threaded screw holes 92 and 94 that are formed in the opposite ends of the spine 42. A shaft pass-through hole 96 is formed in each of the gear shaft and caps 80 and 82. The pass-through holes 96 are axially aligned with threaded cylindrical couplers 98 and 100 which extend from the end caps 80 and 82 for receipt within channels 102 that run longitudinally through each of the opposite ends of the C-shaped spine 42. As is best shown in FIGS. 9 and 10, the outermost ends of the first and second gear shafts 74 and 78 which lie opposite the gear wheels 70 and 72 are coupled to respective ones of the gear shaft end caps 80 and 82 that are attached to the opposite ends of the C-shaped spine 42.

Figure 9:
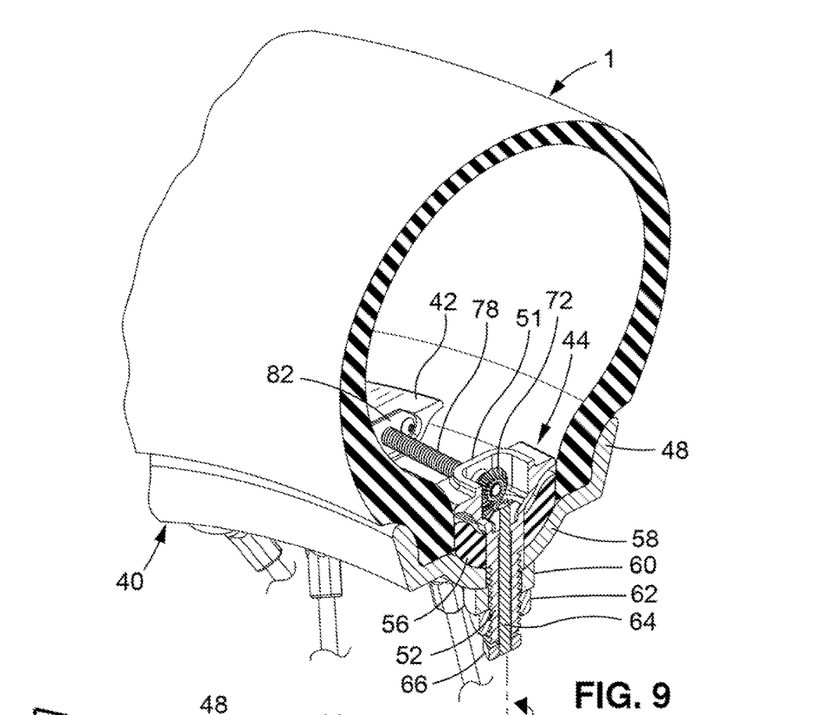
FIG. 9 is a cross-section of the tensioning device surrounded by a tire and mounted on the rim for closing the C-shaped backing to compress the elastomer against the rim.
Figure 10:
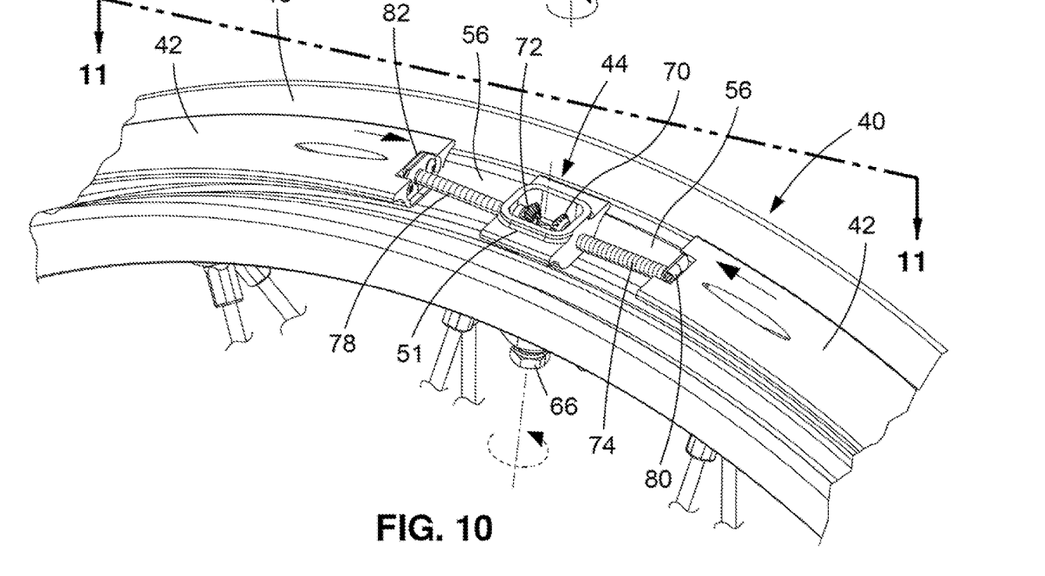
FIG. 10 is a perspective view of the tensioning device mounted on the rim and being operated for closing the C-shaped backing against the rim.
Figure 11:
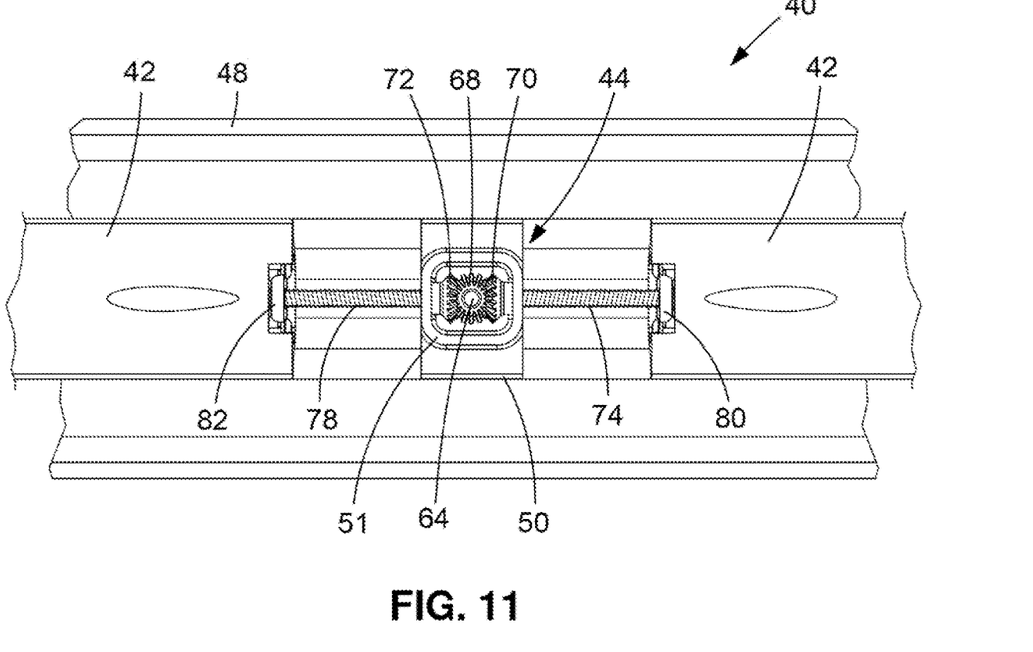
FIG. 11 is a top view taken in the direction of reference arrows 11-11 of FIG. 10 showing the C-shaped backing mounted on the rim in an open configuration.
Figure 12:
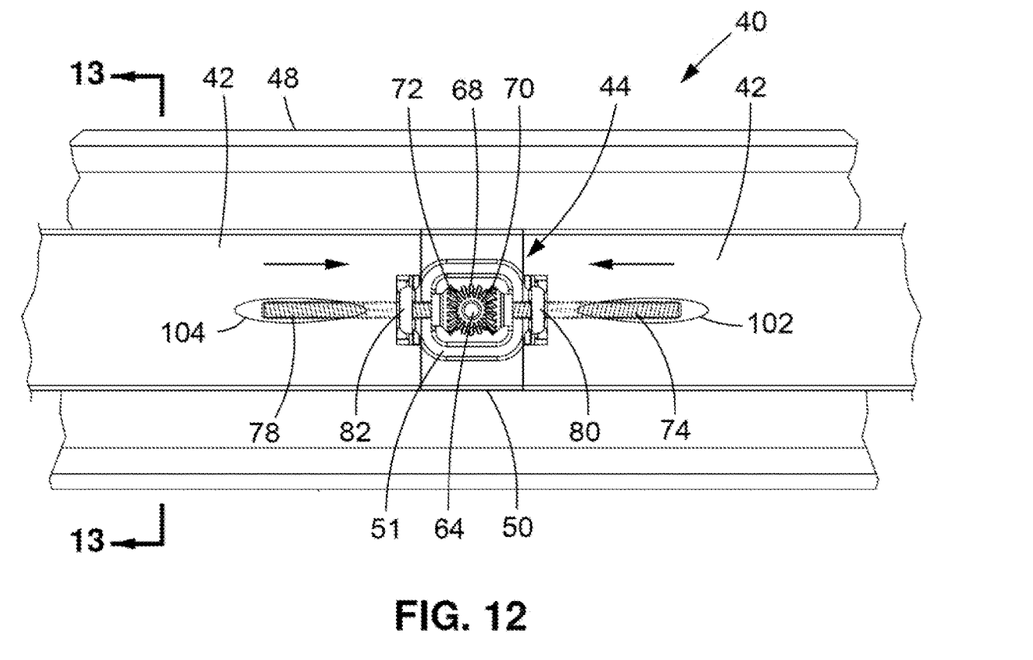
FIG. 12 is a top view of the C-shaped backing of FIG. 11 mounted on the rim in a closed configuration tightened against the rim.

The operation of the tensioning device 44 for closing the C-shaped spine 42 around the rim 48 is now described while referring specifically to FIGS. 9-12. As is best shown in FIGS. 9-11, the opposite ends of the C-shaped spine 42 which surround the elastomer 56 that lays on the rim 48 of the wheel 40 are initially spaced from one another. To generate a pulling force required to pull the opposite ends of the spine 42 towards one another, the drive shaft nut 66 is rotated around the bottom of the drive shaft 64 towards the rim 48.

The rotation of the drive shaft nut 66 causes a corresponding rotation of the drive shaft 64 which, in turn, causes a rotation of the first gear wheel 68 to which the drive shaft is connected. Inasmuch as the first gear wheel 68 is meshed with the second and third gear wheels 70 and 72 within the gear receptacle 51 of the gear housing 50 of the tensioning device 44, a rotation of the first gear wheel 68 causes a corresponding rotation of the gear wheels 70 and 72. The rotation of gear wheels 70 and 72 is imparted to the first and second gear shafts 74 and 78 to which the gears are connected.

Accordingly, and referring now to FIG. 12, the rotating first and second gear shafts 74 and 78 will move in opposite directions and axially through the shaft pass-through holes (designated 96 in FIG. 8) of the gear shaft end caps 80 and 82 such that the free ends of the gear shafts 74 and 78 will project outwardly from respective exit slots 102 and 104 that are formed in adjacent opposite ends of the C-shaped spline 42. The movement of the gear shafts 74 and 78 outwardly from exit slots 102 and 104 causes the opposite ends of the C-shaped spine 42 to be pulled towards one another as represented by the reference arrows shown in FIG. 12. As the space (designated 46 in FIG. 7) between the opposite ends of the spine 42 is shortened, the spine 42 is closed and tightened around the rim 48 of the wheel 40 to correspondingly increase the compressive force applied by the spine against the elastomer 56 over which the spine is laid.

Figure 13:
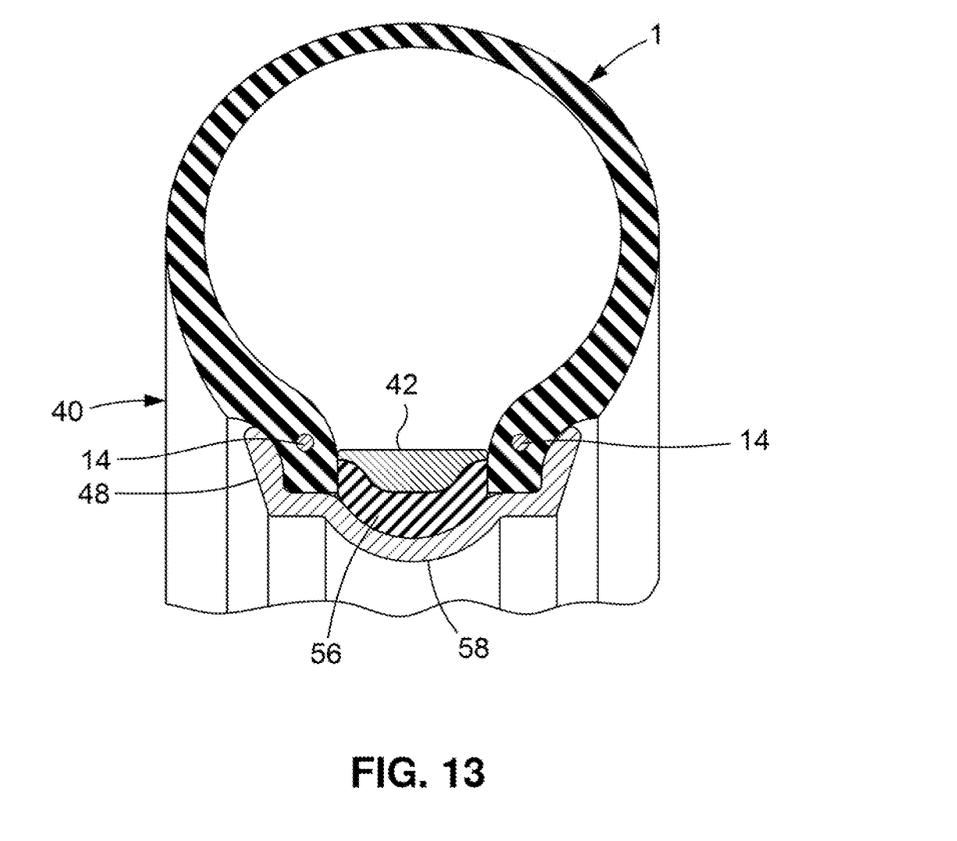
FIG. 13 is a cross-section taken along lines 13-13 of FIG. 12 showing the elastomer lying on the rim below the C-shaped backing surrounded by the tire.

FIG. 13 of the drawings shows a cross-section of the wheel 40 after the drive shaft nut 66 of FIG. 10 has been rotated and the opposite ends of the C-shaped spine 42 have been pulled towards one another to increase the compressive force being applied to the elastomer 56 lying against the beadwell 58 of the rim 48. As previously explained, the compressive force generated by the spine 42 causes the elastomer 56 to be flattened and expand laterally outward along the rim 48 so as to be pressed firmly against the rim and the beads 14 of the tire 1 to create a reliable air-tight rim seal. In the case of FIG. 13, the elastomer 56 is a single piece which extends continuously and circumferentially around the rim 48 of the wheel 40 between the beadwell 58 and the one piece C-shaped spine 42.

Figure 14:
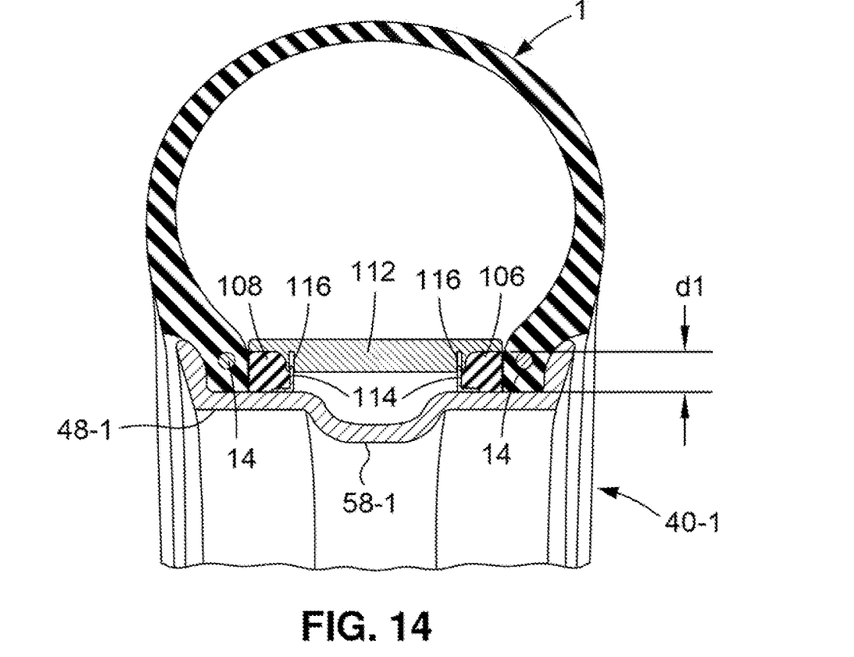
FIG. 14 is a cross-section showing the elastomer in an expanded, relaxed configuration lying below the C-shaped backing on a relatively wide rim of a wheel.
Figure 15:
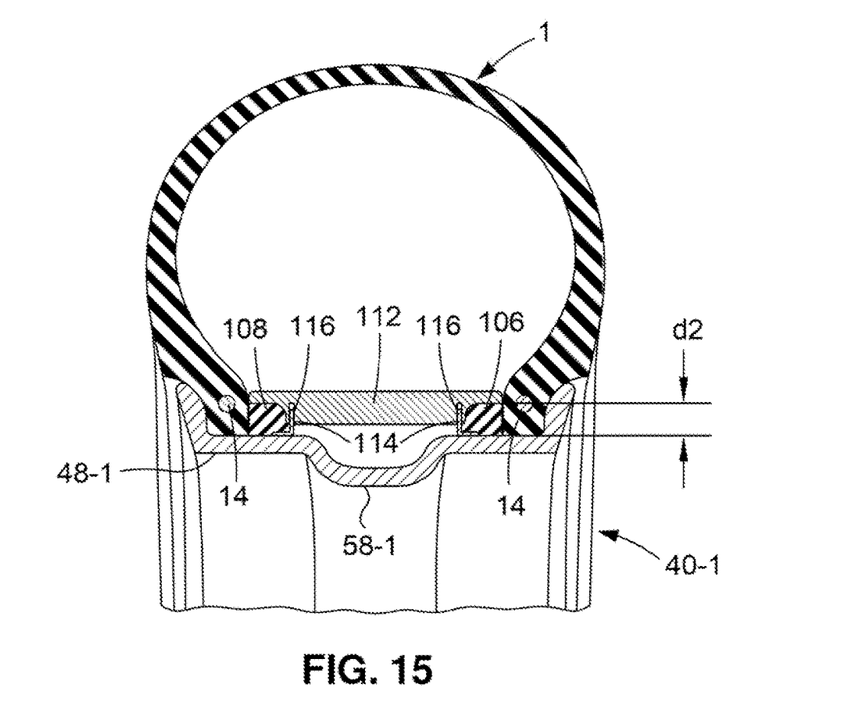
FIG. 15 is a cross-section showing the elastomer in a compressed, stressed configuration lying below the C-shaped backing of the relatively wide rim of FIG. 14.

Turning to FIGS. 14 and 15 of the drawings, the one piece elastomer 56 shown in FIGS. 7-13 is replaced by a pair of resilient elastomer segments 106 and 108 that are spaced from one another to lie against the beads 14 at opposite sidewalls of the tire 1. The pair of elastomers 106 and 108 are ideal to be used when the wheel 40-1 and the rim 48-1 are relatively wide compared to the wheel 40 and the rim 48 that are shown in FIGS. 7-13. In this case, the elastomer segments 106 and 108 are seated on the relatively wide rim 48-1 outside the beadwell 58-1 in order to establish a correspondingly wide rim wheel.

A rigid (i.e., stiff) backing or spine 112 having a sufficient length to extend across the beadwell 58-1 lays on top of the elastomers 106 and 108. The spine 112 shown in FIGS. 14 and 15 may be identical to the one piece C-shaped spine designated 42 in FIGS. 7-13. A pair of elastomer containers 114 are received within and held in place by respective grooves 116 that are formed in spine 112. The containers 114 are located inside the elastomer segments 106 and 108 so as to press the elastomers against the beads 14 of the tire 1 and limit the lateral expansion of the elastomers in response to a compressive force applied thereto by the spine 112.

FIG. 14 shows the pair of elastomer segments 106 and 108 relaxed and expanded when the spine 112 is at rest and no compressive force is being applied by the spine to the elastomers. In this case, the elastomers 106 and 108 which lie alongside the tire beads 14 have a first thickness designated d1. FIG. 15 shows the pair of elastomer segments 106 and 108 after being compressed and flattened against the rim 48-1 by the spine 112. In this case, the thickness of the elastomers 106 and 108 is reduced to that designated d2.

At the same time that the spine 112 is tightened against the elastomer segments 106 and 108 to apply a compressive force thereto, the elastomer containers 114 slide upwardly through the grooves 116 that are formed in the spine (best shown in FIG. 15). As previously explained, the elastomer containers 114 limit the lateral expansion along the rim 48-1 of the elastomer segments 106 and 108 in response to the pressure generated when the spine 112 is tightened and the elastomers are pressed against the beads 14 of the tire 1 to create a reliable rim seal.

Figure 16:
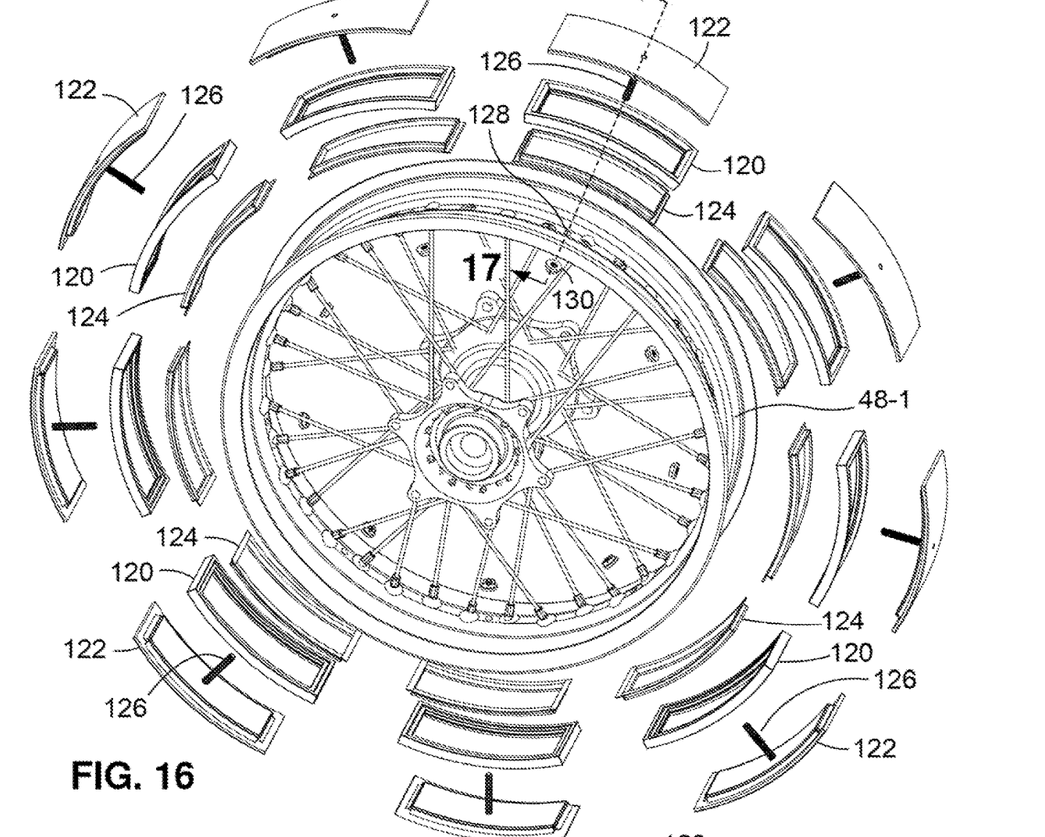
FIG. 16 is an exploded view of another tire and rim seal of this invention including a plurality of backing segments and corresponding pluralities of elastomer segments and elastomer confinement segments extending around the rim of a wheel.
Figure 17:
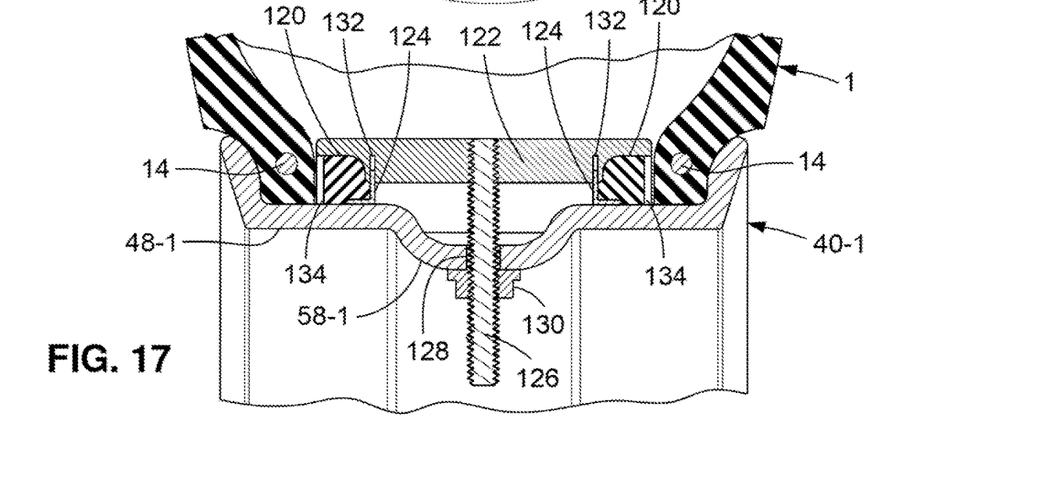
FIG. 17 is a cross-section taken along lines 17-17 of FIG. 16 showing one backing segment, one elastomer segment and one elastomer confinement segment stacked one above the other and being held against the rim.

FIGS. 16 and 17 of the drawings show a modification to and details of the tire and rim seal that was just described while referring to FIGS. 14 and 15. In the case of FIGS. 16 and 17, the tire and rim seal for the wheel 40-1 having a wide rim 48-1 includes a plurality of elastomer segments 120 that are aligned end-to-end one another around the circumference of the rim. The elastomer segments 120 lie between corresponding pluralities of rigid (i.e., stiff) spine segments 122 and elastomer containers 124. Each of the spine segments 122 is a solid rectangular backing member, and each of the elastomer segments 122 and elastomer containers 124 is a rectangular frame that surrounds an open interior.

One of a plurality of threaded bolts 126 that extends radially inward from one of the spine segments 122 runs through the open interiors of an elastomer segment 120 that lies below the spine segment 122 and an elastomer container 124 that lies below the elastomer segment. The threaded bolt 126 is received through a mounting hole 128 (best shown in FIG. 17) that is formed in the beadwell 58-1 of the rim 48-1. A threaded nut 130 (also best shown in FIG. 17) surrounds the bottom of the bolt 126 that extends outwardly below the beadwell 58-1 to hold the bolt in place and maintain the stacked alignment of a spine segment 122 located above and pressing an elastomer segment 120 and an elastomer container 124 against the rim 48-1. One of the plurality of bolts 126 is hollow (not shown) to enable the tire 1 to be inflated with air.

FIG. 17 shows details of the aforementioned stacked alignment containing one of the rectangular elastomer containers 124 being surrounded by one of the rectangular elastomer segments 120 below one of the spine segments 122. The spine segment 122 creates a solid backing to press the elastomer segment 120 against the rim 48-1 of the wheel 40-1. As previously described, the threaded bolt 126 which extends radially inward from the spine segment 122 is connected to the rim 48-1 by way of the mounting hole 128 so that a compressive force is generated when the spine segment 122 is pulled by bolt 126 toward the elastomer segment 120 laying on the rim. As also previously described, the rectangular elastomer container 124 lies inside the rectangular elastomer segment 120 to confine the lateral expansion of the elastomer along the rim 48-1 in response to the pressure that is generated when the spine segment 122 is pulled against the elastomer segment 122 as the nut 130 is rotated around the bolt 126 and moved against the bottom of rim 48-1.

As in the case of the tire and rim seal shown in FIG. 15, at the same time that the pressure is generated by the spine segment 122 pressing against the elastomer segment 120, the elastomer container 124 will slide upwardly through grooves 132 that are formed in the spine segment 122. Accordingly, the elastomer segment 120 is compressed against the rim 48-1 to fill in and close the gap 134 between the elastomer and the bead 14 of the tire 1 to create a reliable air-tight seal.

The invention claimed is:

1. A wheel, comprising:
a rim having a pair of lips extending around the periphery thereof;
a tire mounted on the rim to be inflated with air, said tire including a pair of sidewalls having respective beads that lie against the pair of lips of the rim, where each of the beads has an inside surface and an opposite outside surface;
a seal lying on the rim between the beads of the pair of sidewalls, said seal including an elastomeric material that is responsive to a compressive force applied thereto in order to change its shape and become flattened, whereby the seal expands so as to be pressed against the rim and against the inside surfaces of the beads so as to seal the interface between the seal and the beads and thereby prevent air with which the tire is inflated from leaking out of the tire; and
a force generating backing that is responsive to a pulling force applied thereto by which to cause the force generating backing to move towards the elastomeric material of said seal by which to apply the compressive force to cause said elastomeric material to change its shape and be flattened so as to expand and press against the rim and the inside surfaces of the beads in order to prevent air with which the tire is inflated from leaking out of the tire.

2. The wheel recited in claim 1, wherein said seal extends continuously around the rim on which the tire is mounted.

3. The wheel recited in claim 1, wherein said force generating backing is a stiff spine that lays on the elastomeric material of said seal to apply said compressive force thereto.

4. The wheel recited in claim 3, wherein said stiff spine that lays on and applies said compressive force to the elastomeric material of said seal extends completely around the rim of the wheel so as to seal the interface between the seal and the rim.

5. The wheel recited in claim 1, further comprising at least one fastener extending from said force generating backing and running through each of the elastomeric material of said seal and the rim of the wheel, said at least one fastener generating the pulling force for pulling said force generating backing towards said elastomeric material so that said elastomeric material is compressed between said force generating backing and the rim.

6. The wheel recited in claim 5, wherein said at least one fastener is a threaded bolt, said threaded bolt having a threaded nut that is rotated around said threaded bolt and tightened against the bottom of the rim of the wheel through which said threaded bolt extends so as to cause said threaded bolt to generate the pulling force by which to pull said force generating backing towards the rim and against the elastomeric material of said seal whereby said elastomeric material is compressed between said force generating backing and the rim.

7. The wheel recited in claim 6, wherein said threaded bolt is hollow by which an air channel is established through which the tire is inflated with air.

8. The wheel recited in claim 1, wherein said seal includes a plurality of elastomeric seal segments that are responsive to the compressive force applied to said seal by which to change the shape of said seal, and said force generating backing includes a corresponding plurality of spine segments to generate the compressive force to be applied to said seal, said plurality of elastomeric seal segments and said plurality of spine segments extending completely around the rim of the wheel and laying one on top of the other.

9. The wheel recited in claim 8, further comprising a plurality of fasteners extending from respective ones of said plurality of spine segments and running through respective ones of said plurality of elastomeric seal segments on which said plurality of spine segments lay and through the rim of the wheel, said plurality of fasteners pulling said plurality of spine segments against said plurality of elastomeric seal segments to generate said compressive force so that said plurality of elastomeric seal segments change their shape and are compressed between said plurality of spine segments and the rim.

10. A wheel, comprising:
a rim;
a tire mounted on the rim to be inflated with air, said tire including a pair of sidewalls having respective beads that lie on the rim;
an elastomeric sealing material lying on the rim of the wheel between the beads of the tire; and
a backing surrounding the rim of the wheel and lying on said elastomeric sealing material, said backing being responsive to a pulling force applied thereto by which to cause said backing to move towards the rim and against the elastomeric sealing material that lies on the rim to generate a pressure for causing said elastomeric sealing material to be compressed between said backing and the rim, whereby said elastomeric sealing material undergoes a change of its shape so as to become flattened and move along the rim and press against the rim and the beads of the tire to thereby prevent air with which the tire is inflated from leaking out of the tire.

11. The wheel recited in claim 10, wherein said backing that lays on said elastomeric sealing material is a C-shaped spine having first and opposite ends and a space located between said first and opposite ends, said wheel further comprising a spine tensioning device connected between the first and opposite ends of said C-shaped spine and being operable to pull said first and opposite ends towards one another through said space therebetween such that said C-shaped spine is tightened around said elastomeric sealing material to generate the pressure for causing said elastomeric sealing material to be compressed between said C-shaped spine and the rim of the wheel.

12. The wheel recited in claim 11, wherein each of said elastomeric sealing material and the rim of the wheel on which said elastomeric sealing material lays has a mounting hole formed therein, said spine tensioning device having a fastener received through each of the mounting holes of said elastomeric sealing material and the rim by which said spine tensioning device is attached to the rim.

13. The wheel recited in claim 12, wherein said spine tensioning device also has a rotatable drive shaft extending below the rim of the wheel on which said elastomeric sealing material lays, and a first gear wheel coupled to said rotatable drive shaft, said first gear wheel being rotated in response to a rotation of said rotatable drive shaft for causing the first and opposite ends of said C-shaped spine to be pulled towards one another.

14. The wheel recited in claim 13, wherein said spine tensioning device also has a rotatable drive shaft controller mated to the rotatable drive shaft below the rim of the wheel, said rotatable drive shaft controller being rotated to cause a corresponding rotation of each of said rotatable drive shaft and said first gear wheel coupled to said rotatable drive shaft for causing the first and opposite ends of said C-shaped spine to be pulled towards one another.

15. The wheel recited in claim 14, wherein said spine tensioning device also has a pair of rotatable gear shafts and second and third gear wheels connected to respective ones of said pair of rotatable gear shafts and coupled to said first gear wheel, said pair of rotatable gear shafts also being coupled to the first and opposite ends of said C-shaped spine such that a rotation of said first gear wheel is imparted to said second and third gear wheels for causing a corresponding rotation of said pair of rotatable gear shafts and the first and opposite ends of said C-shaped spine to be pulled toward one another.

16. The wheel recited in claim 15, further comprising first and opposite end caps, each of said first and opposite end caps being connected to a respective one of the first and opposite ends of said C-shaped spine and having a threaded coupler, each of said pair of rotatable gear shafts being threaded and received by a respective one of the threaded couplers of said first and opposite end caps so as to move in opposite directions through said threaded couplers and axially within said first and opposite ends to thereby cause said first and opposite ends to move towards one another in response to the rotation of the second and third gear wheels and said pair of rotatable gear shafts connected thereto.

17. A wheel, comprising:
a rim;
a tire mounted on the rim to be inflated with air, said tire including a pair of sidewalls having respective beads that lie on the rim;
a plurality of elastomeric rim seal segments that lie end-to-end one another and extend around the rim of the wheel;
a plurality of spine segments that lie end-to-end one another on top of respective ones of said plurality of elastomeric rim seal segments;
a plurality of rim seal containment segments that lie on the rim against respective ones of said plurality of elastomeric rim seal segments; and
a plurality of fasteners having first ends thereof connected to respective ones of said plurality of spine segments and opposite ends extending from the rim so as to exert pulling forces to cause said plurality of spine segments to move towards the rim and against respective ones of said plurality of elastomeric rim seal segments above which said spine segments lay such that said plurality of elastomeric rim seal segments are compressed by said plurality of spine segments so as to expand along the rim and seal against the rim and the tire beads on the rim, said plurality of rim seal containment segments controlling the expansion of said plurality of elastomeric rim seal segments.

18. A wheel, comprising:
a rim;
a tire mounted on the rim to be inflated with air, said tire including a pair of sidewalls having respective beads that lie on the rim, where each of said beads has an inside surface and an outside surface;
an elastomeric sealing material lying on the rim of the wheel between the beads of the tire and being responsive to a compressive force for causing said elastomeric sealing material to be compressed, whereby said elastomeric sealing material undergoes a change of its shape so as to move along the rim and towards the beads so as to press against the rim and press against the inside surfaces of the beads so as to seal a first interface lying between the sealing material and the rim and a second interface lying between the sealing material and the inside surfaces of the beads in order to prevent air with which the tire is inflated from leaking out of the tire through said first and second interfaces; and
a force generating backing laying on the elastomeric sealing material and responsive to a force applied thereto by which to cause said force generating backing to move towards and against said elastomeric sealing material in order to apply the compressive force thereto so as to cause said elastomeric sealing material to be flattened and thereby expand along the rim of the wheel and press against the rim and the inside surfaces of the beads of the tire in order to seal each of said first and second interfaces.

19. A wheel, comprising:
a one-piece rim having a beadwell and a pair of lips extending continuously around the periphery of the beadwell;
a tire mounted on the one-piece rim to be inflated with air, said tire including a pair of sidewalls having respective beads that lie within the beadwell and against the pair of lips of the rim, where each of the beads has an inside surface and an opposite outside surface;
an elastomeric seal lying within the beadwell of the one-piece rim between the beads of the pair of sidewalls, said elastomeric seal being responsive to a pressure applied thereto, whereby the elastomeric seal is pressed against the beadwell of the one-piece rim to cause said elastomeric seal to be compressed so as to change its shape and become flattened to thereby expand and move along and against the beadwell towards and against the inside surfaces of the beads so as to seal a first interface lying between the seal and the one-piece rim and a second interface lying between the seal and the inside surfaces of the beads in order to prevent air with which the tire is inflated from leaking out of the tire; and a force generating backing that lays on the elastomeric seal, said force generating backing being responsive to a pulling force applied thereto for causing said force generating backing to be pulled towards and against said elastomeric seal to apply the pressure thereto and thereby cause said elastomeric seal to change its shape and expand along the beadwell of said one-piece rim, said elastomeric seal extending continuously around the beadwell of said rim.

20. A wheel, comprising:

a rim;

a tire mounted on the rim to be inflated with air, said tire including a pair of sidewalls having respective beads that lie on the rim;

an elastomeric sealing material lying on the rim of the wheel between the beads of the tire; and a backing surrounding the rim of the wheel and lying on said elastomeric sealing material, said backing moving towards the rim and the elastomeric sealing material that lies on the rim to generate a pressure for causing said elastomeric sealing material to be compressed between said backing and the rim, whereby said elastomeric sealing material undergoes a change of its shape so as to move along the rim and press against the rim and the beads of the tire to seal the interface between the elastomeric sealing material and the beads to thereby prevent air with which the tire is inflated from leaking out of the tire through said interface, said backing having a C-shaped spine including first and opposite ends and a space located between said first and opposite ends, said wheel further comprising a spine tensioning device connected between the first and opposite ends of said C-shaped spine and being operable to pull said first and opposite ends towards one another through said space therebetween such that said C-shaped spine is tightened around said elastomeric sealing material to generate the pressure for causing said elastomeric sealing material to be compressed between said C-shaped spine and the rim of the wheel.

* * * * *